(12) United States Patent
Pollock et al.

(10) Patent No.: US 8,401,704 B2
(45) Date of Patent: Mar. 19, 2013

(54) GNSS CONTROL SYSTEM AND METHOD FOR IRRIGATION AND RELATED APPLICATIONS

(75) Inventors: Colin J. Pollock, Phoenix, AZ (US); Kirk Burnell, Phoenix, AZ (US)

(73) Assignee: Hemisphere GPS, LLC, Hiawatha, KS (US)

( * ) Notice: Subject to any disclaimer, the term of this patent is extended or adjusted under 35 U.S.C. 154(b) by 909 days.

(21) Appl. No.: 12/507,590

(22) Filed: Jul. 22, 2009

(65) Prior Publication Data

US 2011/0022238 A1    Jan. 27, 2011

(51) Int. Cl.
G05D 7/06 (2006.01)
G01S 19/38 (2010.01)
B05B 3/00 (2006.01)

(52) U.S. Cl. ......... 700/284; 239/723; 239/728; 239/739

(58) Field of Classification Search .................. 700/284; 239/69, 723, 728, 739; 342/357.26
See application file for complete search history.

(56) References Cited

U.S. PATENT DOCUMENTS

| | | | |
|---|---|---|---|
| 3,585,537 A | 6/1971 | Rennick et al. | |
| 3,596,228 A | 7/1971 | Reed, Jr. et al. | |
| 3,727,710 A | 4/1973 | Sanders et al. | |
| 3,815,272 A | 6/1974 | Marleau | |
| 3,899,028 A | 8/1975 | Morris et al. | |
| 3,987,456 A | 10/1976 | Gelin | |
| 4,132,272 A | 1/1979 | Holloway et al. | |
| 4,170,776 A | 10/1979 | MacDoran | |
| 4,180,133 A | 12/1979 | Collogan et al. | |
| 4,398,162 A | 8/1983 | Nagai | |
| 4,453,614 A | 6/1984 | Allen et al. | |
| 4,529,990 A | 7/1985 | Brunner | |
| 4,637,474 A | 1/1987 | Leonard | |
| 4,667,203 A | 5/1987 | Counselman, III | |
| 4,689,556 A | 8/1987 | Cedrone | |

(Continued)

FOREIGN PATENT DOCUMENTS

JP 07244150 9/1995
WO WO9836288 8/1998

(Continued)

OTHER PUBLICATIONS

Parkinson, Bradford W., et al., "Global Positioning System: Theory and Applications, vol. II", Bradford W. Parkinson and James J. Spiker, Jr., eds., *Global Postioning System: Theory and Applicaitons*, vol. II, 1995, AIAA, Reston, VA, USA, pp. 3-50, (1995),3-50.

(Continued)

*Primary Examiner* — Charles Kasenge
(74) *Attorney, Agent, or Firm* — Law Office of Mark Brown, LLC; Mark E. Brown

(57) ABSTRACT

A global navigation satellite sensor system (GNSS) control system and method for irrigation and related applications is provided for a boom assembly with main and extension boom sections, which are hingedly connected and adapted for folding. The control system includes an antenna and a receiver connected to the antenna. A rover antenna is mounted on the boom extension section and is connected to the receiver. A processor receives GNSS positioning signals from the receiver and computes locations for the antennas, for which a vector indicating an attitude of the extension boom section can be computed. Various boom arrangements and field configurations are accommodated by alternative aspects of the control system.

23 Claims, 9 Drawing Sheets

VECTOR W/ CORNER EXTENSION

U.S. PATENT DOCUMENTS

| | | |
|---|---|---|
| 4,694,264 A | 9/1987 | Owens et al. |
| 4,710,775 A | 12/1987 | Coe |
| 4,714,435 A | 12/1987 | Stipanuk et al. |
| 4,739,448 A | 4/1988 | Rowe et al. |
| 4,751,512 A | 6/1988 | Longaker |
| 4,769,700 A | 9/1988 | Pryor |
| 4,785,463 A | 11/1988 | Janc et al. |
| 4,802,545 A | 2/1989 | Nystuen et al. |
| 4,812,991 A | 3/1989 | Hatch |
| 4,813,991 A | 3/1989 | Hale |
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A | 4/1993 | Geier |
| 5,207,239 A | 5/1993 | Schwitalia |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A | 8/1994 | Teach |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen et al. |
| 5,664,632 A | 9/1997 | Frasier |
| 5,673,491 A | 10/1997 | Brenna et al. |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvili |
| 5,725,230 A | 3/1998 | Walkup |
| 5,731,786 A | 3/1998 | Abraham et al. |
| 5,739,785 A | 4/1998 | Allison et al. |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cosenza et al. |
| 5,875,408 A | 2/1999 | Bendett et al. |
| 5,877,725 A | 3/1999 | Kalafus |
| 5,890,091 A | 3/1999 | Talbot et al. |
| 5,899,957 A | 5/1999 | Loomis |
| 5,906,645 A | 5/1999 | Kagawa et al. |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A | 7/1999 | Greatline et al. |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,933,110 A | 8/1999 | Tang |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Van Dusseldorp |
| 5,944,770 A | 8/1999 | Enge et al. |
| 5,945,917 A | 8/1999 | Harry |
| 5,949,371 A | 9/1999 | Nichols |
| 5,955,973 A | 9/1999 | Anderson |
| 5,956,250 A | 9/1999 | Gudat et al. |
| 5,969,670 A | 10/1999 | Kalafus et al. |
| 5,987,383 A | 11/1999 | Keller et al. |
| 6,014,101 A | 1/2000 | Loomis |
| 6,014,608 A | 1/2000 | Seo |
| 6,018,313 A | 1/2000 | Engelmayer et al. |
| 6,023,239 A | 2/2000 | Kovach |
| 6,052,647 A | 4/2000 | Parkinson et al. |
| 6,055,477 A | 4/2000 | McBurney et al. |
| 6,057,800 A | 5/2000 | Yang et al. |
| 6,061,390 A | 5/2000 | Meehan et al. |
| 6,061,632 A | 5/2000 | Dreier |
| 6,062,317 A | 5/2000 | Gharsalli |
| 6,069,583 A | 5/2000 | Silvestrin et al. |
| 6,076,612 A | 6/2000 | Carr et al. |
| 6,081,171 A | 6/2000 | Ella |
| 6,100,842 A | 8/2000 | Dreier et al. |
| 6,104,978 A | 8/2000 | Harrison et al. |
| 6,122,595 A | 9/2000 | Varley et al. |
| 6,128,574 A | 10/2000 | Diekhans |
| 6,144,335 A | 11/2000 | Rogers et al. |

| | | |
|---|---|---|
| 6,191,730 B1 | 2/2001 | Nelson, Jr. |
| 6,191,733 B1 | 2/2001 | Dizchavez |
| 6,198,430 B1 | 3/2001 | Hwang et al. |
| 6,198,992 B1 | 3/2001 | Winslow |
| 6,199,000 B1 | 3/2001 | Keller et al. |
| 6,205,401 B1 | 3/2001 | Pickhard et al. |
| 6,215,828 B1 | 4/2001 | Signell et al. |
| 6,229,479 B1 | 5/2001 | Kozlov et al. |
| 6,230,097 B1 | 5/2001 | Dance et al. |
| 6,233,511 B1 | 5/2001 | Berger et al. |
| 6,236,916 B1 | 5/2001 | Staub et al. |
| 6,236,924 B1 | 5/2001 | Motz |
| 6,253,160 B1 | 6/2001 | Hanseder |
| 6,256,583 B1 | 7/2001 | Sutton |
| 6,259,398 B1 | 7/2001 | Riley |
| 6,266,595 B1 | 7/2001 | Greatline et al. |
| 6,285,320 B1 | 9/2001 | Olster et al. |
| 6,290,151 B1 * | 9/2001 | Barker et al. ............... 239/729 |
| 6,292,132 B1 | 9/2001 | Wilson |
| 6,307,505 B1 | 10/2001 | Green |
| 6,313,788 B1 | 11/2001 | Wilson |
| 6,314,348 B1 | 11/2001 | Winslow |
| 6,325,684 B1 | 12/2001 | Knight |
| 6,336,066 B1 | 1/2002 | Pellenc et al. |
| 6,345,231 B2 | 2/2002 | Quincke |
| 6,356,602 B1 | 3/2002 | Rodal et al. |
| 6,377,889 B1 | 4/2002 | Soest |
| 6,380,888 B1 | 4/2002 | Kucik |
| 6,389,345 B2 | 5/2002 | Phelps |
| 6,392,589 B1 | 5/2002 | Rogers et al. |
| 6,397,147 B1 | 5/2002 | Whitehead |
| 6,415,229 B1 | 7/2002 | Diekhans |
| 6,418,031 B1 | 7/2002 | Archambeault |
| 6,421,003 B1 | 7/2002 | Riley et al. |
| 6,424,915 B1 | 7/2002 | Fukuda et al. |
| 6,431,576 B1 | 8/2002 | Viaud et al. |
| 6,434,462 B1 | 8/2002 | Bevly et al. |
| 6,445,983 B1 | 9/2002 | Dickson et al. |
| 6,445,990 B1 | 9/2002 | Manring |
| 6,449,558 B1 | 9/2002 | Small |
| 6,463,091 B1 | 10/2002 | Zhodzicshsky et al. |
| 6,463,374 B1 | 10/2002 | Keller et al. |
| 6,466,871 B1 | 10/2002 | Reisman et al. |
| 6,469,663 B1 | 10/2002 | Whitehead et al. |
| 6,484,097 B2 | 11/2002 | Fuchs et al. |
| 6,501,422 B1 | 12/2002 | Nichols |
| 6,512,992 B1 * | 1/2003 | Fowell et al. ............... 702/150 |
| 6,515,619 B1 | 2/2003 | McKay, Jr. |
| 6,516,271 B2 | 2/2003 | Upadhyaya et al. |
| 6,539,303 B2 | 3/2003 | McClure et al. |
| 6,542,077 B2 | 4/2003 | Joao |
| 6,549,835 B2 | 4/2003 | Deguchi |
| 6,553,299 B1 | 4/2003 | Keller et al. |
| 6,553,300 B2 | 4/2003 | Ma et al. |
| 6,553,311 B2 | 4/2003 | Ahearn et al. |
| 6,570,534 B2 | 5/2003 | Cohen et al. |
| 6,577,952 B2 | 6/2003 | Geier et al. |
| 6,587,761 B2 | 7/2003 | Kumar |
| 6,606,542 B2 | 8/2003 | Hauwiller et al. |
| 6,611,228 B2 | 8/2003 | Toda et al. |
| 6,611,754 B2 | 8/2003 | Klein |
| 6,611,755 B1 | 8/2003 | Coffee et al. |
| 6,622,091 B2 | 9/2003 | Perlmutter et al. |
| 6,631,394 B1 | 10/2003 | Ronkka et al. |
| 6,631,916 B1 | 10/2003 | Miller |
| 6,643,576 B1 | 11/2003 | O'Connor et al. |
| 6,646,603 B2 | 11/2003 | Dooley et al. |
| 6,657,875 B1 | 12/2003 | Zeng et al. |
| 6,671,587 B2 | 12/2003 | Hrovat et al. |
| 6,686,878 B1 | 2/2004 | Lange |
| 6,688,403 B2 | 2/2004 | Bernhardt et al. |
| 6,703,973 B1 | 3/2004 | Nichols |
| 6,711,501 B2 | 3/2004 | McClure et al. |
| 6,721,638 B2 | 4/2004 | Zeitler |
| 6,732,024 B2 | 5/2004 | Wilhelm Rekow et al. |
| 6,744,404 B1 | 6/2004 | Whitehead et al. |
| 6,754,584 B2 | 6/2004 | Pinto et al. |
| 6,774,843 B2 | 8/2004 | Takahashi |
| 6,792,380 B2 | 9/2004 | Toda |
| 6,819,269 B2 | 11/2004 | Flick |
| 6,822,314 B2 | 11/2004 | Beasom |
| 6,865,465 B2 | 3/2005 | McClure |
| 6,865,484 B2 | 3/2005 | Miyasaka et al. |
| 6,879,283 B1 | 4/2005 | Bird et al. |
| 6,900,992 B2 | 5/2005 | Kelly et al. |
| 6,922,635 B2 | 7/2005 | Rorabaugh |
| 6,923,390 B1 * | 8/2005 | Barker ............... 239/729 |
| 6,928,339 B2 * | 8/2005 | Barker ............... 700/284 |
| 6,931,233 B1 | 8/2005 | Tso et al. |
| 6,961,018 B2 | 11/2005 | Heppe et al. |
| 6,967,538 B2 | 11/2005 | Woo |
| 6,990,399 B2 | 1/2006 | Hrazdera et al. |
| 7,006,032 B2 | 2/2006 | King et al. |
| 7,026,982 B2 | 4/2006 | Toda et al. |
| 7,027,918 B2 | 4/2006 | Zimmerman et al. |
| 7,031,725 B2 | 4/2006 | Rorabaugh |
| 7,089,099 B2 | 8/2006 | Shostak et al. |
| 7,142,956 B2 | 11/2006 | Heiniger et al. |
| 7,155,335 B2 | 12/2006 | Rennels |
| 7,162,348 B2 | 1/2007 | McClure et al. |
| 7,191,061 B2 | 3/2007 | McKay et al. |
| 7,221,314 B2 | 5/2007 | Brabec et al. |
| 7,231,290 B2 | 6/2007 | Steichen et al. |
| 7,248,211 B2 | 7/2007 | Hatch et al. |
| 7,271,766 B2 | 9/2007 | Zimmerman et al. |
| 7,277,784 B2 | 10/2007 | Weiss |
| 7,292,186 B2 | 11/2007 | Miller et al. |
| 7,324,915 B2 | 1/2008 | Altmann |
| 7,358,896 B2 | 4/2008 | Gradincic et al. |
| 7,373,231 B2 | 5/2008 | McClure et al. |
| 7,388,539 B2 | 6/2008 | Whitehead et al. |
| 7,395,769 B2 | 7/2008 | Jensen |
| 7,428,259 B2 | 9/2008 | Wang et al. |
| 7,437,230 B2 | 10/2008 | McClure et al. |
| 7,451,030 B2 | 11/2008 | Eglington et al. |
| 7,479,900 B2 | 1/2009 | Horstemeyer |
| 7,505,848 B2 | 3/2009 | Flann et al. |
| 7,522,099 B2 | 4/2009 | Zhodzishsky et al. |
| 7,522,100 B2 | 4/2009 | Yang et al. |
| 7,571,029 B2 | 8/2009 | Dai et al. |
| 7,689,354 B2 | 3/2010 | Heiniger et al. |
| 2003/0014171 A1 | 1/2003 | Ma et al. |
| 2003/0093210 A1 | 5/2003 | Kondo et al. |
| 2003/0187560 A1 | 10/2003 | Keller et al. |
| 2003/0208319 A1 | 11/2003 | Ell et al. |
| 2004/0039514 A1 | 2/2004 | Steichen et al. |
| 2004/0212533 A1 | 10/2004 | Whitehead et al. |
| 2005/0080559 A1 | 4/2005 | Ishibashi et al. |
| 2005/0225955 A1 | 10/2005 | Grebenkemper et al. |
| 2005/0265494 A1 | 12/2005 | Goodlings |
| 2006/0027677 A1 * | 2/2006 | Abts ............... 239/67 |
| 2006/0031664 A1 | 2/2006 | Wilson et al. |
| 2006/0167600 A1 | 7/2006 | Nelson et al. |
| 2006/0206246 A1 | 9/2006 | Walker |
| 2006/0215739 A1 | 9/2006 | Williamson et al. |
| 2007/0001035 A1 * | 1/2007 | Barker ............... 239/723 |
| 2007/0078570 A1 | 4/2007 | Dai et al. |
| 2007/0088447 A1 | 4/2007 | Stothert et al. |
| 2007/0121708 A1 | 5/2007 | Simpson |
| 2007/0205940 A1 | 9/2007 | Yang et al. |
| 2007/0285308 A1 | 12/2007 | Bauregger et al. |
| 2008/0129586 A1 | 6/2008 | Martin |
| 2008/0204312 A1 | 8/2008 | Euler |
| 2009/0171583 A1 | 7/2009 | DiEsposti |
| 2009/0174597 A1 | 7/2009 | DiLellio et al. |
| 2009/0174622 A1 | 7/2009 | Kanou |
| 2009/0177395 A1 | 7/2009 | Stelpstra |
| 2009/0177399 A1 | 7/2009 | Park et al. |
| 2009/0259397 A1 | 10/2009 | Stanton |
| 2009/0259707 A1 | 10/2009 | Martin et al. |
| 2009/0262014 A1 | 10/2009 | DiEsposti |
| 2009/0262018 A1 | 10/2009 | Vasilyev et al. |
| 2009/0262974 A1 | 10/2009 | Lithopoulos |
| 2009/0265054 A1 | 10/2009 | Basnayake |
| 2009/0265101 A1 | 10/2009 | Jow |
| 2009/0265104 A1 | 10/2009 | Shroff |
| 2009/0273372 A1 | 11/2009 | Brenner |
| 2009/0273513 A1 | 11/2009 | Huang |

| | | | | | | |
|---|---|---|---|---|---|---|
| 2009/0274079 A1 | 11/2009 | Bhatia et al. | | 2010/0232351 A1 | 9/2010 | Chansarkar et al. |
| 2009/0274113 A1 | 11/2009 | Katz | | 2010/0235093 A1 | 9/2010 | Chang |
| 2009/0276155 A1 | 11/2009 | Jeerage et al. | | 2010/0238976 A1 | 9/2010 | Young |
| 2009/0295633 A1 | 12/2009 | Pinto et al. | | 2010/0241347 A1 | 9/2010 | King et al. |
| 2009/0295634 A1 | 12/2009 | Yu et al. | | 2010/0241353 A1 | 9/2010 | Park |
| 2009/0299550 A1 | 12/2009 | Baker | | 2010/0241441 A1 | 9/2010 | Page et al. |
| 2009/0322597 A1 | 12/2009 | Medina Herrero et al. | | 2010/0241864 A1 | 9/2010 | Kelley et al. |
| 2009/0322598 A1 | 12/2009 | Fly et al. | | | | |
| 2009/0322600 A1 | 12/2009 | Whitehead et al. | | | | |
| 2009/0322601 A1 | 12/2009 | Ladd et al. | | | | |
| 2009/0322606 A1 | 12/2009 | Gronemeyer | | | | |
| 2009/0326809 A1 | 12/2009 | Colley et al. | | | | |
| 2010/0013703 A1 | 1/2010 | Tekawy et al. | | | | |
| 2010/0026569 A1 | 2/2010 | Amidi | | | | |
| 2010/0030470 A1 | 2/2010 | Wang et al. | | | | |
| 2010/0039316 A1 | 2/2010 | Gronemeyer et al. | | | | |
| 2010/0039318 A1 | 2/2010 | Kmiecik | | | | |
| 2010/0039320 A1 | 2/2010 | Boyer et al. | | | | |
| 2010/0039321 A1 | 2/2010 | Abraham | | | | |
| 2010/0060518 A1 | 3/2010 | Bar-Sever et al. | | | | |
| 2010/0063649 A1 | 3/2010 | Wu | | | | |
| 2010/0084147 A1 | 4/2010 | Aral | | | | |
| 2010/0085249 A1 | 4/2010 | Ferguson et al. | | | | |
| 2010/0085253 A1 | 4/2010 | Ferguson et al. | | | | |
| 2010/0103033 A1 | 4/2010 | Roh | | | | |
| 2010/0103034 A1 | 4/2010 | Tobe et al. | | | | |
| 2010/0103038 A1 | 4/2010 | Yeh et al. | | | | |
| 2010/0103040 A1 | 4/2010 | Broadbent | | | | |
| 2010/0106414 A1 | 4/2010 | Whitehead | | | | |
| 2010/0106445 A1 | 4/2010 | Kondoh | | | | |
| 2010/0109944 A1 | 5/2010 | Whitehead et al. | | | | |
| 2010/0109945 A1 | 5/2010 | Roh | | | | |
| 2010/0109947 A1 | 5/2010 | Rintanen | | | | |
| 2010/0109948 A1 | 5/2010 | Razoumov et al. | | | | |
| 2010/0109950 A1 | 5/2010 | Roh | | | | |
| 2010/0111372 A1 | 5/2010 | Zheng et al. | | | | |
| 2010/0114483 A1 | 5/2010 | Heo et al. | | | | |
| 2010/0117894 A1 | 5/2010 | Velde et al. | | | | |
| 2010/0117899 A1 | 5/2010 | Papadimitratos et al. | | | | |
| 2010/0117900 A1 | 5/2010 | van Diggelen et al. | | | | |
| 2010/0121577 A1 | 5/2010 | Zhang et al. | | | | |
| 2010/0124210 A1 | 5/2010 | Lo | | | | |
| 2010/0124212 A1 | 5/2010 | Lo | | | | |
| 2010/0134354 A1 | 6/2010 | Lennen | | | | |
| 2010/0149025 A1 | 6/2010 | Meyers et al. | | | | |
| 2010/0149030 A1 | 6/2010 | Verma et al. | | | | |
| 2010/0149033 A1 | 6/2010 | Abraham | | | | |
| 2010/0149034 A1 | 6/2010 | Chen | | | | |
| 2010/0149037 A1 | 6/2010 | Cho | | | | |
| 2010/0150284 A1 | 6/2010 | Fielder et al. | | | | |
| 2010/0152949 A1 | 6/2010 | Nunan et al. | | | | |
| 2010/0156709 A1 | 6/2010 | Zhang et al. | | | | |
| 2010/0156712 A1 | 6/2010 | Pisz et al. | | | | |
| 2010/0156718 A1 | 6/2010 | Chen | | | | |
| 2010/0159943 A1 | 6/2010 | Salmon | | | | |
| 2010/0161179 A1 | 6/2010 | McClure et al. | | | | |
| 2010/0161211 A1 | 6/2010 | Chang | | | | |
| 2010/0161568 A1 | 6/2010 | Xiao | | | | |
| 2010/0171660 A1 | 7/2010 | Shyr et al. | | | | |
| 2010/0171757 A1 | 7/2010 | Melamed | | | | |
| 2010/0185364 A1 | 7/2010 | McClure | | | | |
| 2010/0185366 A1 | 7/2010 | Heiniger et al. | | | | |
| 2010/0185389 A1 | 7/2010 | Woodard | | | | |
| 2010/0188285 A1 | 7/2010 | Collins | | | | |
| 2010/0188286 A1 | 7/2010 | Bickerstaff et al. | | | | |
| 2010/0189163 A1 | 7/2010 | Burgi et al. | | | | |
| 2010/0207811 A1 | 8/2010 | Lackey | | | | |
| 2010/0210206 A1 | 8/2010 | Young | | | | |
| 2010/0211248 A1 | 8/2010 | Craig et al. | | | | |
| 2010/0211315 A1 | 8/2010 | Toda | | | | |
| 2010/0211316 A1 | 8/2010 | DaSilva | | | | |
| 2010/0220004 A1 | 9/2010 | Malkos et al. | | | | |
| 2010/0220008 A1 | 9/2010 | Conover et al. | | | | |
| 2010/0222076 A1 | 9/2010 | Poon et al. | | | | |
| 2010/0225537 A1 | 9/2010 | Abraham | | | | |
| 2010/0228408 A1 | 9/2010 | Ford | | | | |
| 2010/0228480 A1 | 9/2010 | Lithgow et al. | | | | |
| 2010/0231443 A1 | 9/2010 | Whitehead | | | | |
| 2010/0231446 A1 | 9/2010 | Marshall et al. | | | | |

FOREIGN PATENT DOCUMENTS

| | | |
|---|---|---|
| WO | WO0024239 | 5/2000 |
| WO | WO03019430 | 3/2003 |
| WO | WO2005/011938 | 12/2005 |
| WO | WO2009/006618 | 5/2009 |
| WO | WO-2009082745 | 7/2009 |
| WO | WO2009012658 | 10/2009 |
| WO | WO2009/014863 | 12/2009 |
| WO | WO-2010005945 | 1/2010 |
| WO | WO-2010104782 | 9/2010 |
| WO | WO-2011014431 | 2/2011 |

OTHER PUBLICATIONS

"Orthman Manufacturing Co., www.orthman.com/htm;guidance.htm", 2004, regarding the "Tracer Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers* vol. 1, Monetrey, California American Institute of Aeronautics and Astronautics, Inc., (May 2004),136-143.

Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware (EH'02)*, (2002).

Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc.

Park, Chansik et al., "Integer Ambiguity Resolution for GPS Based Attitude Determination System", *SICE Jul. 29-31, 1998*, Chiba, 1115-1120.

Last, J. D., et al., "Effect of skywave interference on coverage of radiobeacon DGPS stations", *IEEE Proc.—Radar, Sonar Navig.*, vol. 144, No. 3, Jun. 1997, pp. 163-168.

"International Search Report and Written Opinion", PCT/US2004/015678, filed May 17, 2004, Jun. 21, 2005.

"ISO", *11783 Part 7 Draft Amendment 1 Annex, Paragraphs B.6 and B.7.ISO 11783-7 2004 DAM1*, ISO: Mar. 8, 2004.

Kaplan, E D., "Understanding GPS: Principles and Applications", *Artech House*, MA, 1996.

Irsigler, M et al., "PPL Tracking Performance in the Presence of Oscillator Phase Noise", *GPS Solutions*, vol. 5, No. 4, pp. 45-57 (2002).

Ward, Phillip W., "Performance Comparisons Between FLL, PLL and a Novel FLL-Assisted-PLL Carrier Tracking Loop Under RF Interference Conditions", *11th Int. Tech Meeting of the Satellite Division of the U.S. Inst. of Navigation*, Nashville, TN, Sep. 15-18, 1998, 783-795.

Bevly, David M., "Comparison of INS v. Carrier-Phase DGPS for Attitude Determination in the Control of Off-Road Vehicles", *ION 55th Annual Meeting*; Jun. 28-30, 1999; Cambridge, Massachusetts; pp. 497-504.

Keicher, R. et al., "Automatic Guidance for Agricultural Vehicles in Europe", *Computers and Electronics in Agriculture*, vol. 25, (Jan. 2000),169-194.

Takac, Frank et al., "SmartRTK: A Novel Method of Processing Standardised RTCM Network RTK Information for High Precision Positioning", *Proceedings of ENC GNSS 2008*, Toulouse, France,(Apr. 22, 2008).

"International Search Report", PCT/US09/49776, (Aug. 11, 2009).

"International Search Report", PCT/AU/2008/000002, (Feb. 28, 2008).

"International Search Report", PCT/US09/33693, (Mar. 30, 2009).

"International Search Report", PCT/US09/039686, (May 26, 2009).

"International Search Report,", PCT/US09/34376, (Nov. 2, 2009).
"International Search Report", PCT/US09/067693, (Jan. 26, 2010).
"International Search Report and Written Opinion", PCT/US10/21334, (Mar. 12, 2010).
Rho, Hyundho et al., "Dual-Frequency GPS Precise Point Positioning with WADGPS Corrections", [retrieved on May 18, 2010]. Retrieved from the Internet: URL: http://gauss.gge.unb.ca/papers.pdf/iongnss2005.rho.wadgps.pdf (Jul. 12, 2006).
"Eurocontrol, Pegasus Technical Notes on SBAS", report [online], Dec. 7, 2004 [retrieved on May 18, 2010], Retrieved from the Internet: http://www.icao.int/icao/en/ro/nacc/meetings/2004/gnss/documentation/Pegasus/tn.pdf> (Dec. 7, 2004), p. 89 paras [0001]-[0004].
"ARINC Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf>, Dec. 7, 2004), p. 168 para [0001].
Schaer, et al., "Determination and Use of GPS Differential Code Bias Values", Presentation [online]. Revtrieved May 18, 2010. Retrieved from the internet: <http://nng.esoc.esa.de/ws2006/REPR2.pdf>, (May 8, 2006).
"International Search Report", PCT/US10/26509, (Apr. 20, 2010).
"International Search Report", PCT/US09/33567, (Feb. 9, 2009).
"International Search Report and Written Opinion", PCT/IB2008/003796 (Jul. 15, 2009).
"International Search Report/ Written Opinion", PCT/US09/63594.
"International Search Report", PCT/US09/60668.
"International Search Report and Written Opinion", International Searching Authortiy, PCT/US08/88070, Feb. 9, 2009.
"ISR Notification & Written Opinion", PCT/US10/26509, (Apr. 20, 2010),1-7.
"Notification Concerning Transmittal of International Report on Patentability (PCT)", PCT/US2009/049776, (Jan. 20, 2011).
"Notification of Transmittal of InternatinalPrelim. Report of Patentability", International Application No. PCT/US09/039686, (Oct. 21, 2010).
"International Search Report and Written Opinion", PCT/US2010/043094, (Sep. 17, 2010).
"Notification of Publication of International Application", WO 2011/014431, (Feb. 3, 2011).
"International Search Report and Written Opinion", PCT/US08/81727, (Dec. 23, 2008).

* cited by examiner

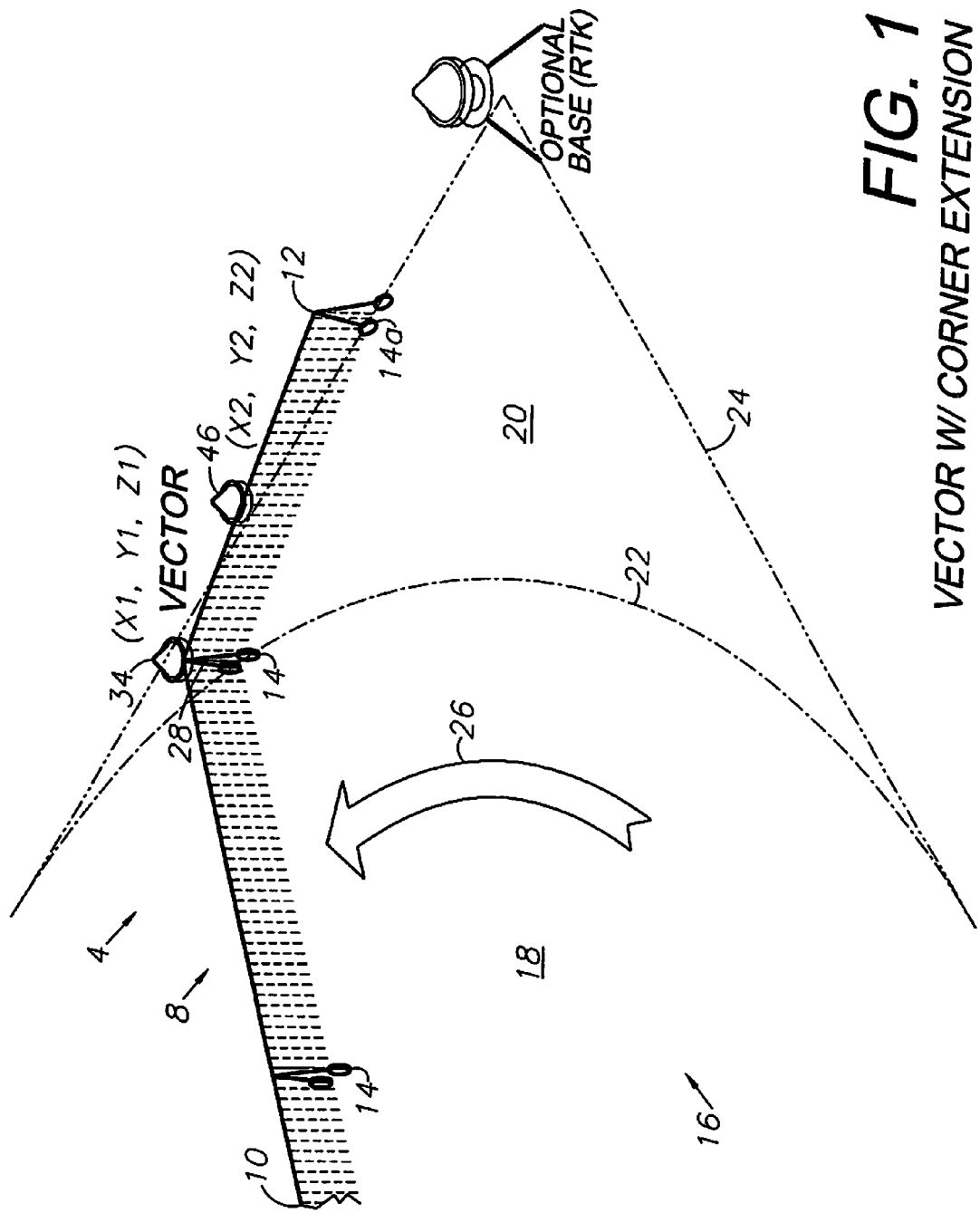

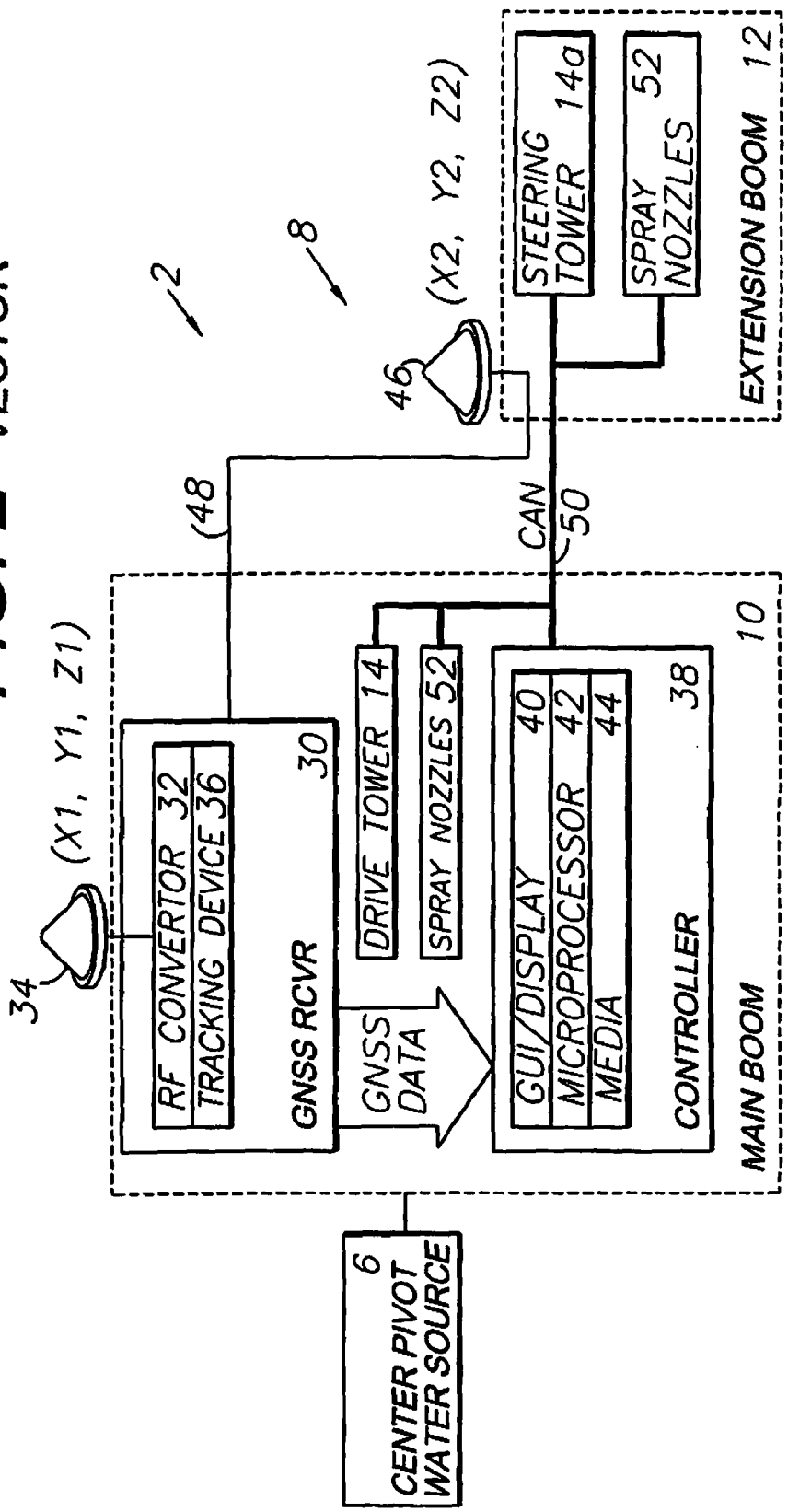

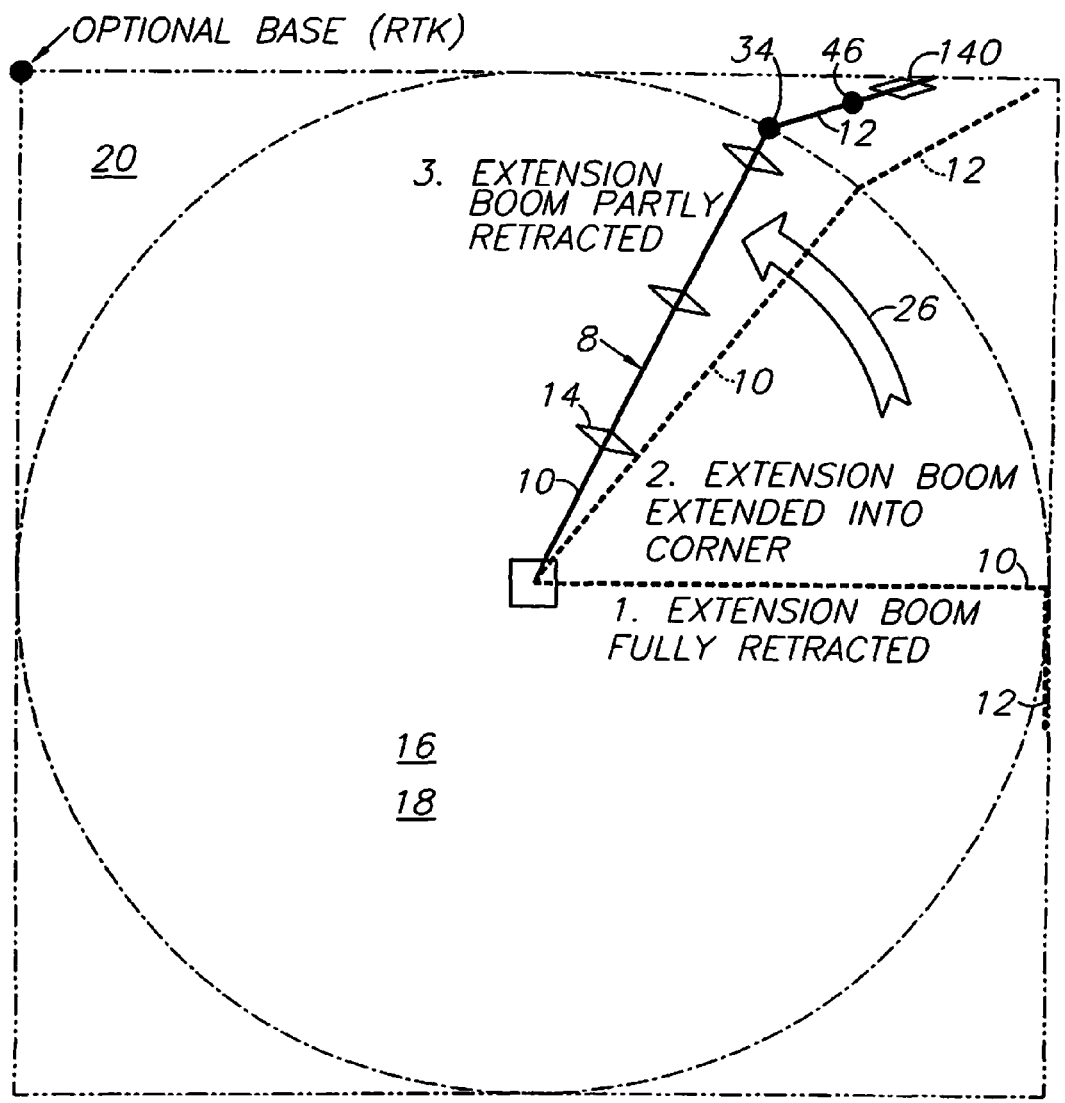
FIG. 3  VECTOR W/ CORNER EXTENSION

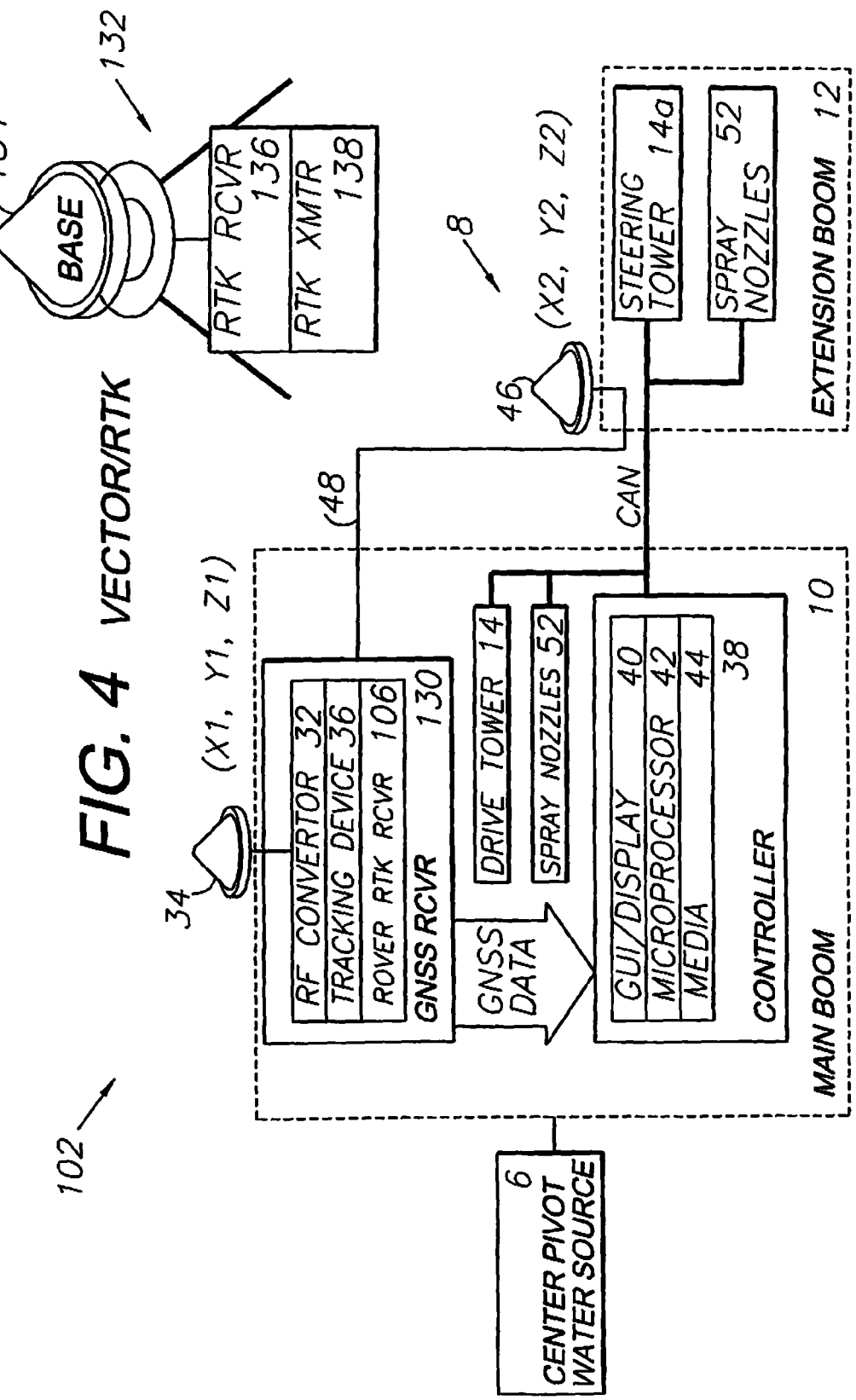

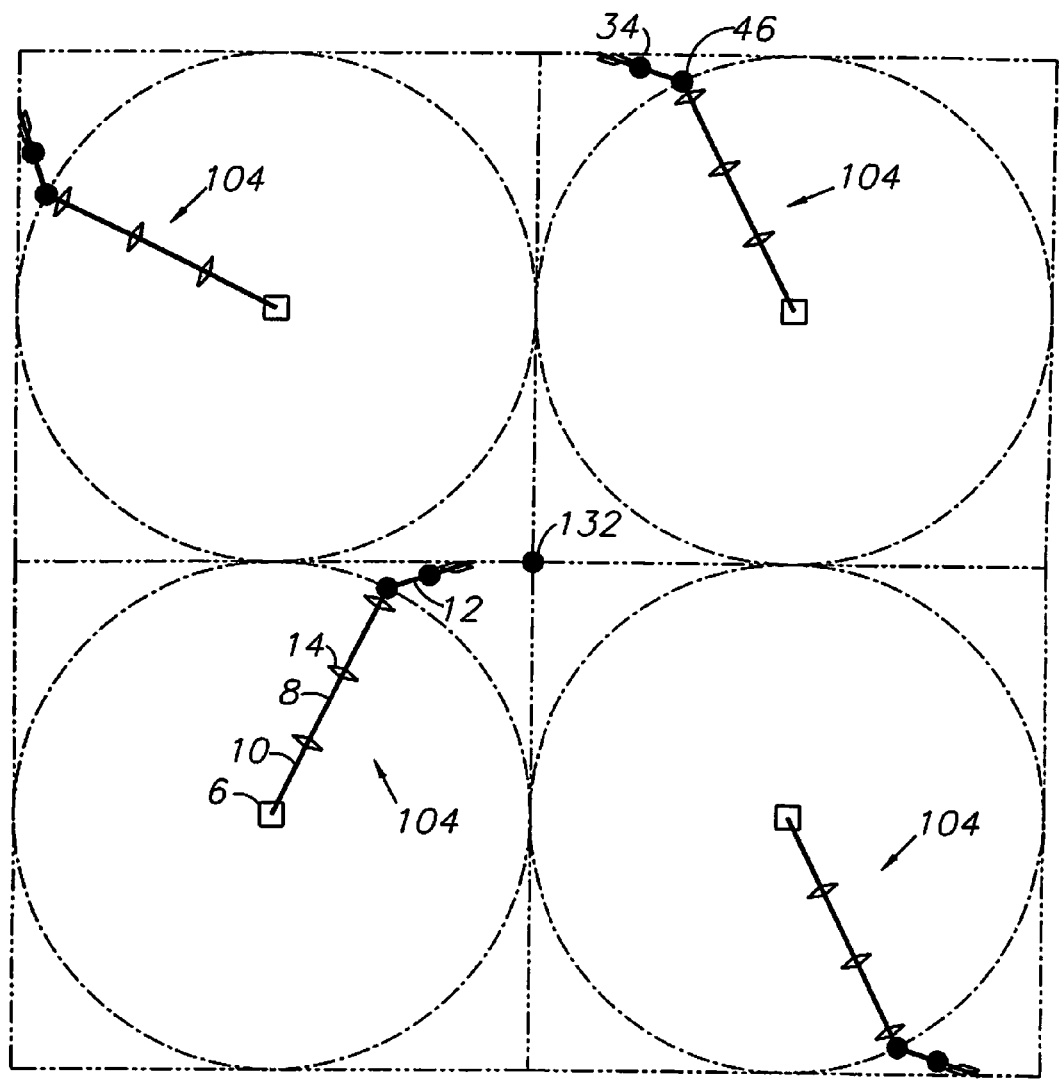
FIG. 5 MULTI-FIELDS

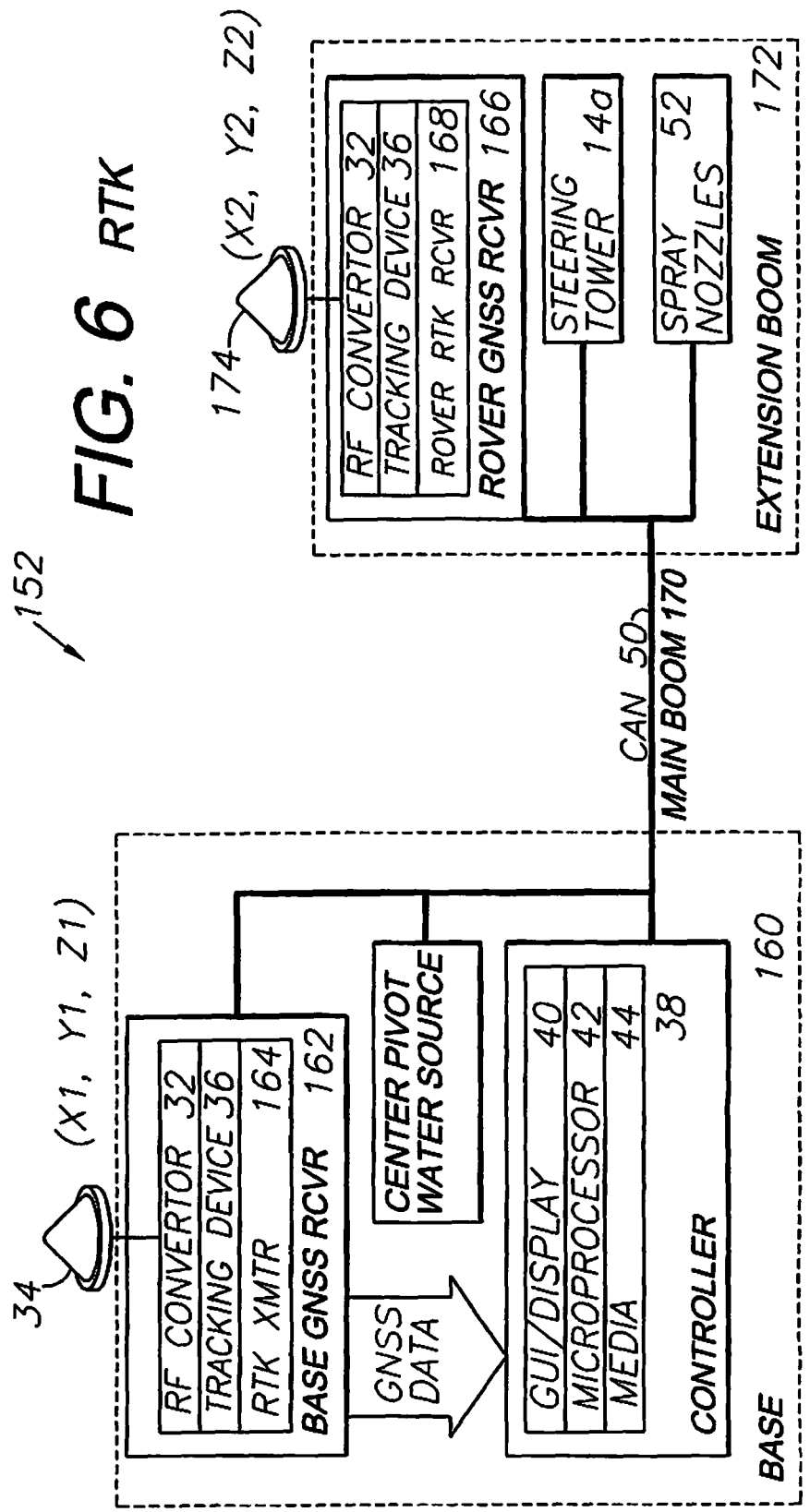

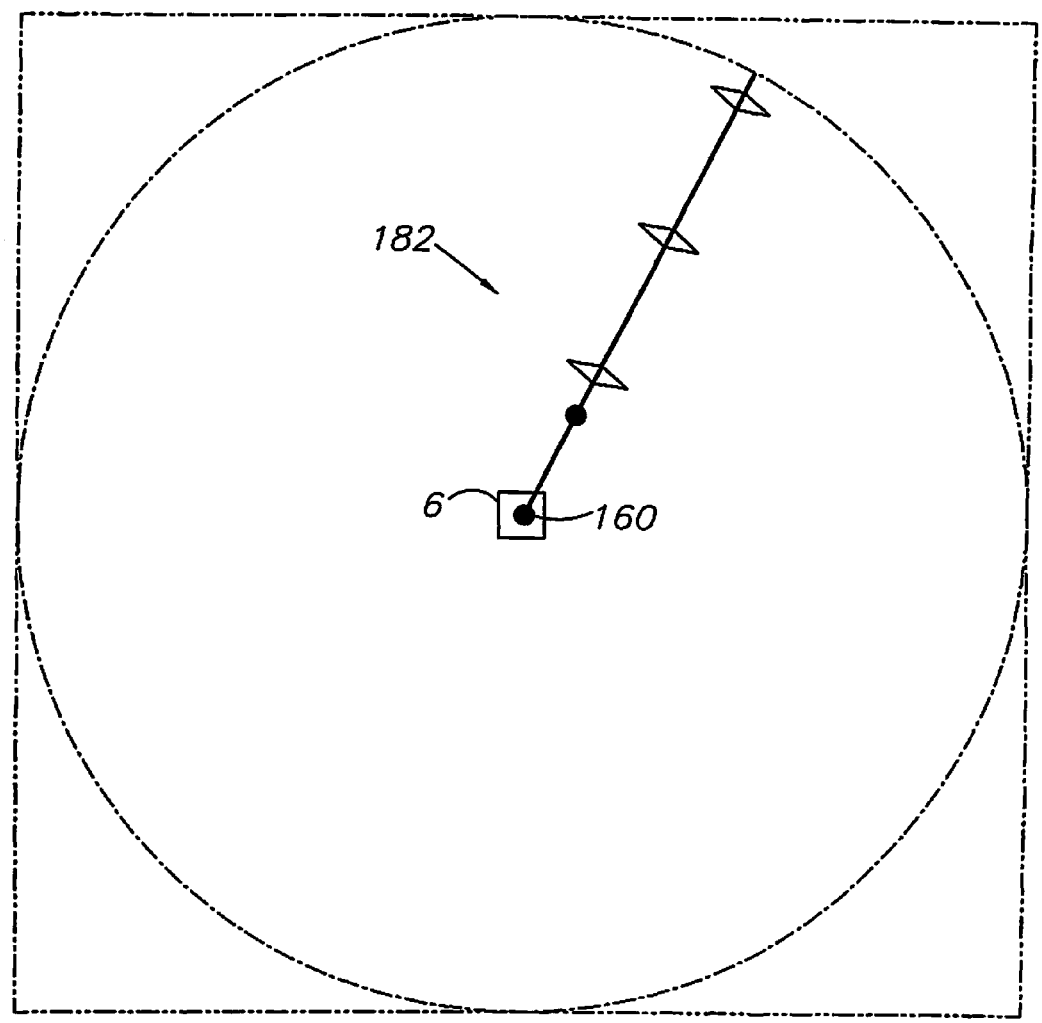
FIG. 7 CENTER PIVOT BASE

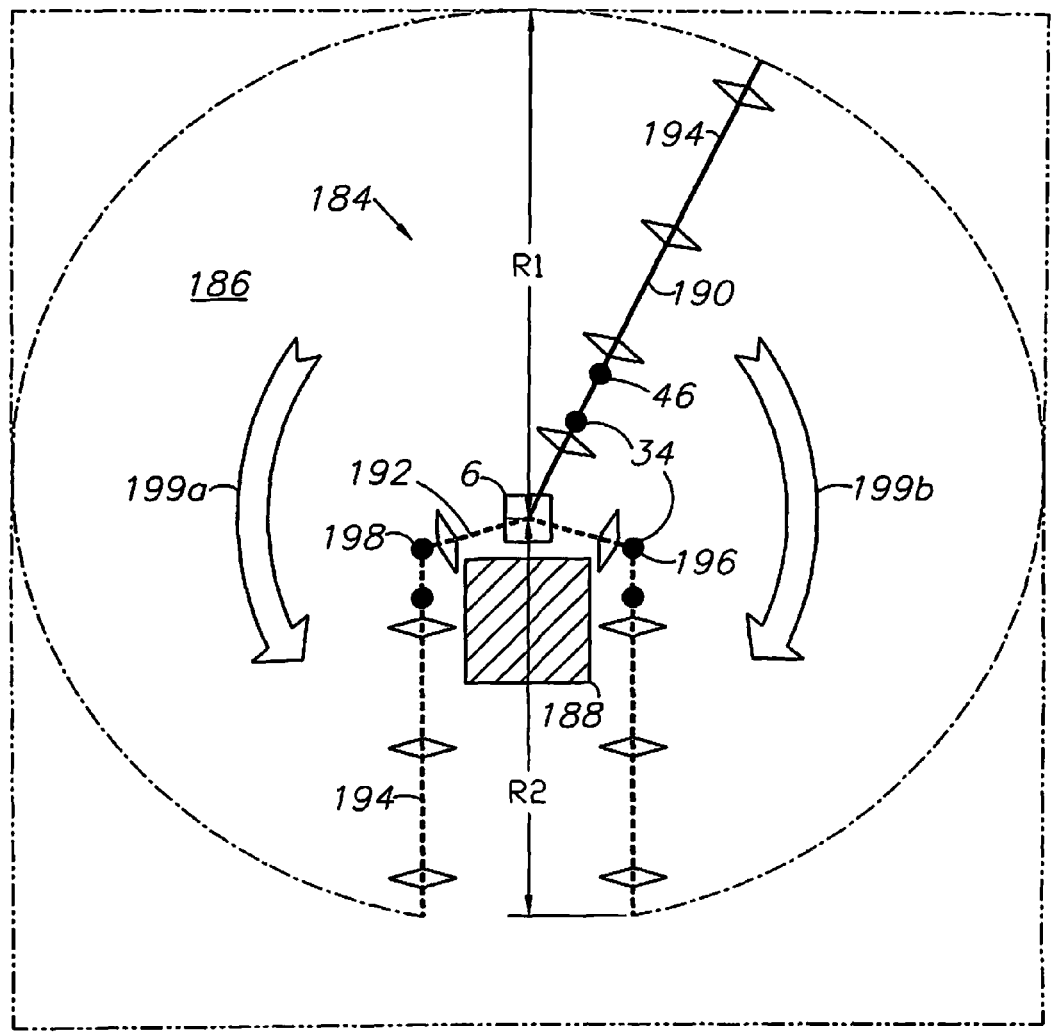
FIG. 8  OBSTACLE AVOIDANCE

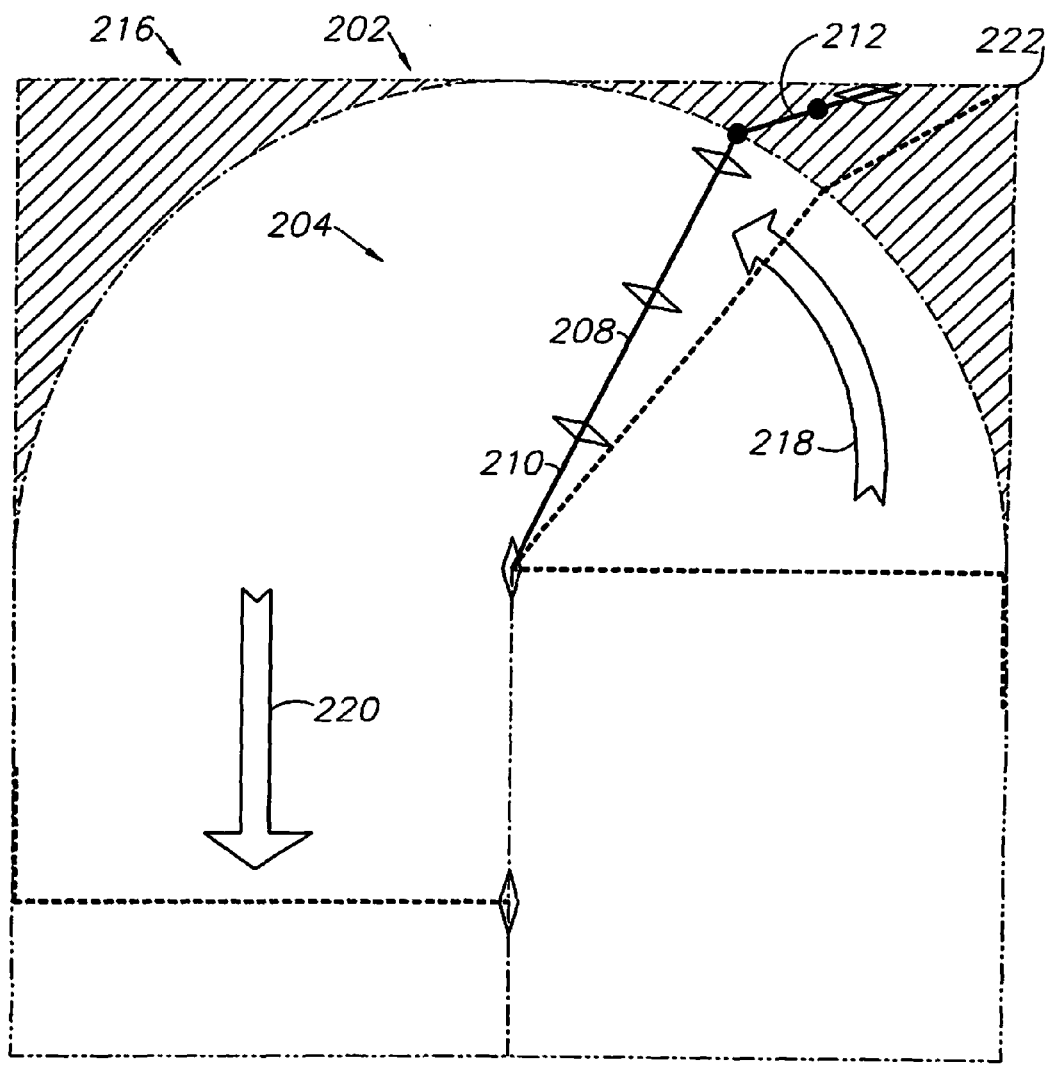
FIG. 9 RECTANGULAR FIELD

GNSS CONTROL SYSTEM AND METHOD FOR IRRIGATION AND RELATED APPLICATIONS

BACKGROUND OF THE INVENTION

1. Field of the Invention

The present invention relates generally to global navigation satellite system (GNSS) control systems and methods for mobile, fixed-course equipment for irrigation and related applications.

2. Description of the Related Art

GNSS guidance and control are widely used for vehicle and personal navigation and a variety of other uses involving precision location in geodesic reference systems. GNSS, which includes the Global Positioning System (GPS) and other satellite-based positioning systems, has progressed to sub-centimeter accuracy with known correction techniques, including a number of commercial Satellite Based Augmentation Systems (SBASs).

Agricultural equipment represents a significant market for GNSS control systems. Various aspects of agricultural equipment guidance can benefit from GNSS technology, including tillage, planting, spraying (e.g., applying fertilizer, herbicides, pesticides, etc.) and harvesting. In arid regions, mechanized irrigation techniques and equipment have greatly increased crop production and correspondingly made vast tracts of previously barren land viable for productive agriculture, thus enhancing its value and crop yields. Broadly speaking, mechanized irrigation involves pumping water from a source and spraying it on crops and/or fields. Although sprayer vehicles are extensively used and widely available, their operation tends to be relatively expensive due to operating costs such as labor and fuel, and capital costs of vehicles. Therefore, automatic irrigation systems tapping into subterranean aquifers are widely used and cover large areas relatively cost-effectively. Typical large-scale irrigation uses distribution piping carried on self-propelled support towers and supplying multiple spray nozzles, which pass over crops and distribute water evenly thereon. Self-propelled irrigation equipment is constructed for linear operation, e.g., along guide paths, and for center-pivot operation, which produces circular irrigation patterns.

Such irrigation equipment tends to move relatively slowly and operate relatively automatically, and is thus ideal for autonomous guidance and control. Previous methods of monitoring and guiding irrigation devices include positive position encoders located at the center pivot for monitoring angular or rotational orientation of the irrigation boom with respect to the center pivot. Another method included buried wires and sensors, which were detectable by equipment mounted on the rotating booms.

Global navigation satellite systems (GNSS), including global positioning systems (GPS), have also been used for center pivot irrigation monitoring and guidance. For example, U.S. Pat. No. 6,095,439 discloses a corner irrigation system including a GPS guidance system. Field corners, which would otherwise fall outside a circular coverage pattern, are accommodated by an extension boom, which is pivotable with respect to a main boom and swings out into the field corners under GPS guidance. However, previous GPS guidance and control systems for agricultural irrigation have tended to be relatively expensive, complex, inaccurate and/or susceptible to other deficiencies and disadvantages.

It is known in the art that by using GPS satellites' carrier phase transmissions, and possibly carrier phase signal components from base reference stations or Space Based Augmentation Systems (SBAS) satellites, including Wide Area Augmentation System (WAAS) (U.S.), and similar systems such as EGNOS (European Union) and MSAS (Japan), a position may readily be determined to within millimeters. When accomplished with two antennas at a fixed spacing, an angular rotation may be computed using the position differences. In an exemplary embodiment, two antennas placed in the horizontal plane may be employed to compute a heading (rotation about a vertical axis) from a position displacement. Heading information, combined with position, either differentially corrected (DGPS) or carrier phase corrected (RTK), provides the feedback information desired for a proper control of the vehicle direction.

Another benefit achieved by incorporating a GPS-based heading sensor is the elimination or reduction of drift and biases resultant from a gyro-only or other inertial sensor approach. Yet another advantage is that heading may be computed while movable equipment is stopped or moving slowly, which is not possible in a single-antenna, GPS-based approach that requires a velocity vector to derive a heading. Yet another advantage is independence from a host vehicle's sensors or additional external sensors. Thus, such a system is readily maintained as equipment-independent and may be moved from one vehicle to another with minimal effort. Yet another exemplary embodiment of the sensor employs Global Navigation Satellite System (GNSS) sensors and measurements to provide accurate, reliable positioning information. GNSS sensors include, but are not limited to GPS, Global Navigation System (GLONAS), Wide Area Augmentation System (WAAS) and the like, as well as combinations including at least one of the foregoing.

An example of a GNSS is the Global Positioning System (GPS) established by the United States government, which employs a constellation of 24 or more satellites in well-defined orbits at an altitude of approximately 26,500 km. These satellites continually transmit microwave L-band radio signals in two frequency bands, centered at 1575.42 MHz and 1227.6 MHz, denoted as L1 and L2 respectively. These signals include timing patterns relative to the satellite's onboard precision clock (which is kept synchronized by a ground station) as well as a navigation message giving the precise orbital positions of the satellites, an ionosphere model and other useful information. GPS receivers process the radio signals, computing ranges to the GPS satellites, and by triangulating these ranges, the GPS receiver determines its position and its internal clock error.

In standalone GPS systems that determine a receiver's antenna position coordinates without reference to a nearby reference receiver, the process of position determination is subject to errors from a number of sources. These include errors in the GPS satellite's clock reference, the location of the orbiting satellite, ionosphere induced propagation delay errors, and troposphere refraction errors.

To overcome these positioning errors of standalone GPS systems, many positioning applications have made use of data from multiple GPS receivers. Typically, in such applications, a reference receiver, located at a reference site having known coordinates, receives the GPS satellite signals simultaneously with the receipt of signals by a remote receiver. Depending on the separation distance between the two GPS receivers, many of the errors mentioned above will affect the satellite signals equally for the two receivers. By taking the difference between signals received both at the reference site and the remote location, these errors are effectively eliminated. This facilitates an accurate determination of the remote receiver's coordinates relative to the reference receiver's coordinates.

The technique of differencing signals from two or more GPS receivers to improve accuracy is known as differential GPS (DGPS). Differential GPS is well known and exhibits many forms. In all forms of DGPS, the positions obtained by the end user's remote receiver are relative to the position(s) of the reference receiver(s). GPS applications have been improved and enhanced by employing a broader array of satellites such as GNSS and WAAS. For example, see commonly assigned U.S. Pat. No. 6,469,663 to Whitehead et al. titled Method and System for GPS and WAAS Carrier Phase Measurements for Relative Positioning, dated Oct. 22, 2002, the disclosures of which are incorporated by reference herein in their entirety. Additionally, multiple receiver DGPS has been enhanced by utilizing a single receiver to perform differential corrections. For example, see commonly assigned U.S. Pat. No. 6,397,147 to Whitehead titled Relative GPS Positioning Using A Single GPS Receiver With Internally Generated Differential Correction Terms, dated May 28, 2002 the disclosures of which are incorporated by reference herein in their entireties.

Heretofore there has not been available a GNSS control system for agricultural irrigation and related applications with the advantages and features of the present invention.

SUMMARY OF THE INVENTION

Disclosed herein in an exemplary embodiment is a GNSS control system for irrigation equipment, which system includes a base GNSS receiver with a base antenna, which can be mounted on a main irrigation boom, and a rover antenna mounted on an extension irrigation boom, which pivots outwardly from the main irrigation boom to cover field corners. The GNSS ranging signals received by the antennas are processed by a single receiver and processor for determining a position and/or attitude of the extension boom, which is guided through the corners thereby. Alternative aspects include an RTK base unit for receiving and transmitting RTK correction signals. Another alternative aspect provides multiple receivers on the irrigation boom sections. A method is adaptable for obstacle avoidance in an irrigated field. Other field conditions and configurations can be accommodated, including elongated rectangular fields. Spray nozzle operation can also be selectively and individually controlled for irrigation and related applications.

BRIEF DESCRIPTION OF THE DRAWINGS

FIG. 1 is a fragmentary, perspective view of a center-pivot irrigation application of the control system and method of the present invention, particularly showing a vector control of an extension boom section in a field corner;

FIG. 2 is a schematic diagram of the control system, which is configured for determining vectors;

FIG. 3 is a plan view of the center-pivot irrigation equipment application, showing the progressive extension boom section positions and configurations;

FIG. 4 is a schematic diagram of an alternative aspect control system with RTK;

FIG. 5 is a plan view of a center-pivot irrigation application covering multiple, nearby fields and including a centralized RTK receiver;

FIG. 6 is a schematic diagram of a system with the base providing RTK correction;

FIG. 7 is a plan view of a center-pivot irrigation application with a base located at the center pivot;

FIG. 8 is a plan view of a center-pivot irrigation application with the control system and the boom sections configured for obstacle avoidance; and FIG. 9 is a plan view of an irrigation application for an elongated, rectangular field with an extension boom covering the field corners.

DETAILED DESCRIPTION OF THE PREFERRED ASPECTS

I. Introduction and Environment

Global navigation satellite systems (GNSSS) are broadly defined to include GPS (U.S.), Galileo (Europe, proposed), GLONASS (Russia), BeidoulCompass (China, proposed), IRNSS (India, proposed), QZSS (Japan, proposed) and other current and future positioning technology using signals from satellites, with or without augmentation from SBAS or terrestrial reference correction sources. Said terminology will include the words specifically mentioned, derivatives thereof and words of similar meaning.

Without limitation on the generality of useful applications of the present invention, an exemplary application comprises a GNSS control system 2 for self-propelled, center-pivot irrigation equipment 4. "Control," as used herein, encompasses all functions and operating parameters associated with the irrigation equipment 4, such as navigation in a geodetic frame of reference via motive power and steering control, and the operation of operative components such as spray nozzles, pumps, etc.

The irrigation equipment 4 generally includes a center pivot 6 connected to an articulated boom assembly 8, which includes a main boom section 10 and an extension boom section 12. The center pivot 6 can comprise a wellhead connected to a subsurface aquifer, or a suitable water source, such as a pipeline, can supply the equipment 4. A pump can be provided for delivering water under pressure to the boom assembly 8. The boom assembly 8 generally has a horizontal truss configuration and includes multiple drive towers 14 positioned at spaced intervals, including a steerable drive tower 14a supporting and mobilizing the boom extension section 12. As shown in FIG. 1, an irrigated field 16 includes a circular central area 18 with corners 20 between the circumference 22 of the circular area 18 and the field perimeter 24, which generally defines a square in the illustrated example. The boom assembly 8 is shown with a counterclockwise direction of rotation as indicated by the directional arrow 26, although the rotational direction could also be clockwise. The main and extension boom sections 10, 12 intersect at a hinged connection 28, which is generally located at a drive tower 14.

II. GNSS Control System 2

The GNSS control system 2 can comprise a single-receiver, two-antenna vector system as shown in FIG. 2. A GNSS receiver 30 includes an RF converter (downconverter) 32 connected to a first antenna 34, which can be designated as a base, reference or master antenna. A tracking device 36 is connected to the downconverter 32 and provides GNSS-derived ranging data for a controller (CPU) 38, including a graphical user interface (GUI)/display 40, a microprocessor 42 and media 44 for storing data. The controller 38 can be associated with the main boom section 10. A second antenna 46, which can be designated as a rover or slave antenna, is mounted on the extension boom section 12 and is connected to the receiver 30 by an RF cable 48 for providing GNSS-derived ranging signals to the receiver 30. The RF cable 48 has a constant length whereby cable delays are relatively constant and can be accurately calculated and taken into account in processing the GNSS signals. Other relatively constant (linear) delays, such as temperature-related delays, can be accommodated with suitable corrections, such as a lookup table stored in the media 44.

The controller 38 controls the operation of the drive towers 14, 14a via a CAN bus 50 or some other suitable communication mode, such as RS-485 or a wireless RF connection, which can be selected for compatibility with the drive tower control communications of the irrigation system manufacturer. The speed of the drive towers 14 is variably controlled. Moreover, the speed and direction of the steerable drive tower 14a is controlled via the CAN bus 50, or some other suitable communication mode. Multiple spray nozzles 52 can be individually and selectively controlled by the controller 38 via the CAN bus 50. For example, the controller 38 can be preprogrammed for irrigation in varying amounts emitted from the nozzles 52 depending upon, for example, boom speed (increasing proportionally outwardly from the center pivot 6), wind speed and direction, field conditions, crop conditions, etc.

The vector configuration of the GNSS control system 2 provides a heading for the boom extension 12 based on the location differential for the antennas 34, 46 and a fixed distance between them. An advantage of such a vector is that the boom extension 12 heading or attitude can be calculated with the boom 8 at rest or moving slowly, which is typically the case with center-pivot irrigation equipment. Single-antenna systems, on the other hand, require movement to determine a direction of travel based on logged antenna positions from which a heading or direction of travel can be determined.

FIG. 3 shows a sequence of boom assembly 8 configurations for accommodating a square field 16. At the circle quadrants (0°, 90°, 180°, 270°) where the circumference 22 intersects the field perimeter 24, i.e. the first condition, the extension boom section 12 is fully retracted, forming a 90° right angle with the main boom section 10 and trailing directly behind it along the perimeter 24. In the second position the extension boom section 12 is fully extended to reach a corner of the field 16 with the main boom section 10 slightly past the crux of the corner whereafter the extension boom section 12 begins retracting. In other words, the extension boom section 12 is always somewhat trailing the main boom section 10. The third configuration occurs between the first and second configurations, i.e. between the fully-retracted and the fully-extended positions. For example, if the field 16 of FIG. 3 is oriented with due north corresponding to 0°, the extension boom section 12 is partly retracted as the boom assembly 8 traverses from 0° (fully retracted) to 90° (fully retracted). Likewise, partial extension occurs between 90° and 180°, and at corresponding intervals around the circular area 18. The outer end of the extension boom section 12 generally follows the field perimeter 24 whereby the corner areas 20 are substantially completely irrigated, covered or treated, depending upon the nature of the agricultural operation. By determining the extension boom section 12 attitude from the GNSS-defined positions of the antennas 34, 46, the extension boom section 12 can be accurately located and guided with its steerable drive tower 14a. Although the control system 2 can be set up and programmed to compute and track the main boom section 10 position and/or rotational orientation, the extension boom section 12 can be independently guided through the field corners 20 without reference to the location or orientation of the main boom section 10. In other words, the relative locations of the antennas 34, 46 provide sufficient information for properly orienting the extension boom sections 12 through the field corners 20.

U.S. Pat. No. 7,400,294 for Satellite Positioning and Heading Sensor for Vehicle Steering, which is assigned to a common assignee herewith, discloses apparatus and methods for attitude determination using GNSS and is incorporated herein by reference.

III. Alternative Aspect Control Systems, Methods and Applications

A system 102 comprising a vector/RTK alternative aspect of the invention is shown in FIG. 4 and includes a main boom 110 and an extension boom 112 generally similar to the boom sections 10, 12 described above, with the addition of a rover RTK receiver 106 to the main boom GNSS receiver 130 and the addition of a fixed-position RTK base 132 including an RTK antenna 134, a receiver 136 and a transmitter 138. The RTK base 132 transmits GNSS correction values to the rover receiver 106 and/or to the extension boom antenna 46, for computing relatively accurate ranging signal corrections using well-known techniques.

The RTK base 132 can be located anywhere within its effective range, e.g., several kilometers or more, from the irrigation equipment 104. For example, FIG. 5 shows multiple fields 16a, 16b, 16c and 16d serviced by the irrigation equipment 104 and receiving GNSS RTK correction from a centrally-located RTK base 132.

FIG. 6 shows another configuration GNSS RTK system 152, which is similar to the systems 2 and 102 described above, with a base 160 located at the center pivot 6 and including a base GNSS receiver 162 including an RTK transmitter 164. The RTK transmitter 164 transmits RTK correction signals to the rover GNSS receiver 166, which includes a rover RTK receiver 168. Guidance can be provided for the main boom section 170 and the extension boom section 172 using normal RTK positioning techniques, which are well known. In conventional standalone GNSS systems that determine a receiver's antenna position coordinates without reference to a nearby reference receiver, the process of position determination is subject to errors from a number of sources. These include errors in the GNSS satellite's clock reference, the location of the orbiting satellite, ionosphere induced propagation delay errors, and troposphere refraction errors. The RTK positioning systems described above overcome or least minimize such errors by providing correction signals, which are utilized by the processor for canceling out the atmospheric, clock and other positioning errors.

FIG. 7 shows a center pivot application 182 of the GNSS system 152. As shown, the base 160 is located at the center pivot 6 and the rover antenna 174 is located partway out along the boom section 170. In the application shown in FIG. 7, the boom includes only the main boom section 170. FIG. 8 shows an obstacle-avoidance/multiple-radius application 184 of the GNSS control system wherein a field 186 includes an obstacle (such as a structure, an untreated area, etc.) 188 located in proximity to the center pivot 6. An articulated irrigation boom 190 includes a proximate section 192 connected to the center pivot 6 and a distal section 194 pivotally connected to the proximate section 192. A base GNSS receiver 194 (similar to the receivers 30, 132 described above) is mounted on the boom 190 at a hinged connection 198 of its sections 192, 194. A rover antenna 196 is mounted partway out along the boom distal section 194 and is similar to the rover antennas 46 described above. Alternatively, a rover receiver similar to the receivers 106, 166 described above can be utilized. As shown in FIG. 8, the boom 190 is adapted for folding at the hinged connection 198 whereby the obstacle 188 is avoided. Moreover, such folding produces an effective radius of the covered area R2, as opposed to R1 representing the fully-extended boom 190 radius. The system shown in FIG. 8 can be programmed to alternate between clockwise and counterclockwise arcuate paths of movement 199a,b represented by the directional arrows.

FIG. 9 shows a rectangular field 216 representing another irrigation application 204 including a GNSS guidance system 202, which can be similar to the guidance systems 2, 102 and 152 described above. The field 216 is generally rectangular with a medial path of travel 218 for an articulated irrigation boom assembly 208 including main and extension boom sections 210, 212, which operate similar to the boom sections 10, 12 described above. As shown in FIG. 9, the boom assembly 208 is adapted for traveling in a linear path of travel 218, as indicated by the directional arrow 220, with the boom assembly 208 folded. The boom assembly 208 extends across and covers the field corners 222 at each end of its path of travel 218, as described above. Various other field configurations could likewise be accommodated by articulated boom sections similar to those described above. For example, multiple articulated sections could also be provided and controlled with GNSS vector and/or RTK systems.

IV. Conclusion

It will be appreciated that while a particular series of steps or procedures is described as part of the abovementioned guidance method, no order of steps should necessarily be inferred from the order of presentation. For example, the method includes installation and power up or initialization. It should be evident that power-up and initialization could potentially be performed and executed in advance without impacting the methodology disclosed herein or the scope of the claims.

It should further be appreciated that while an exemplary partitioning functionality has been provided, it should be apparent to one skilled in the art that the partitioning could be different. For example, the control of the receivers and the controller could be integrated in other units. The processes for determining the alignment may, for ease of implementation, be integrated into a single receiver. Such configuration variances should be considered equivalent and within the scope of the disclosure and claims herein.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium 44 wherein the computer becomes an apparatus for practicing the invention when the computer program code is loaded into and executed by the computer. The present invention can also be embodied in the form of computer program code stored in a storage medium or loaded into and/or executed by a computer, for example. The present invention can also be embodied in the form of a data signal transmitted by a modulated or unmodulated carrier wave, over a transmission medium, such as electrical wiring or cabling, through fiber optics or via electromagnetic radiation. When the computer program code is loaded into and executed by a computer, the computer becomes an apparatus for practicing the invention. When implemented on a general-purpose microprocessor, the computer program code segments configure the microprocessor to create specific logic circuits.

While the description has been made with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof. Therefore, it is intended that the claims not be limited to the particular embodiments disclosed as the currently preferred best modes contemplated for carrying out the teachings herein, but that the claims shall cover all embodiments falling within the true scope and spirit of the disclosure.

Having thus described the invention, what is claimed as new and desired to be secured by Letters Patent is:

1. A GNSS-based control system for irrigation equipment including a boom assembly with a main boom section, an extension boom section hingedly connected to the main boom section and boom drives mounted on said main and extension boom sections respectively, which control system includes:
    a first GNSS antenna mounted on the boom assembly;
    a GNSS receiver mounted on the boom assembly and connected to the first GNSS antenna;
    a second GNSS antenna mounted on the extension boom section and connected to the receiver;
    a controller including a processor connected to and receiving input signals from said receiver, said processor being adapted for computing position solutions for said antennas using GNSS ranging signals received by said receiver;
    said controller being adapted for controlling said extension boom section drives using said position solutions;
    said boom assembly including multiple spray nozzles;
    each said spray nozzle having a variable discharge rate;
    said processor being adapted for selectively and individually controlling said spray nozzle discharge rates based on GNSS-defined positions of said extension boom section;
    an RTK base including a base GNSS antenna, a base RTK receiver connected to said base antenna and a base RTK transmitter connected to said base antenna;
    said RTK base adapted to service multiple fields located in proximity to said RTK base;
    said controller being programmed with a GNSS-defined location of an obstacle located in a field in the path of said boom assembly;
    said extension boom section having a stop position in proximity to said GNSS-defined obstacle location; and
    said stop position being GNSS-defined.
2. The invention of claim 1, which includes:
    said control system including a radio frequency (RF) correction signal receiver connected to said controller; and
    said RTK base being located in spaced relation from said irrigation equipment and transmitting RTK correction signals to said correction signal receiver.
3. The invention of claim 2, which includes:
    each field having irrigation equipment including a respective boom assembly and a respective GNSS-based control system controlling said irrigation equipment; and
    said RTK base providing RTK correction signals to said control systems.
4. The invention of claim 1, which includes:
    said irrigation equipment having a center-pivot configuration with a central water source and said boom assembly main section having a proximate end pivotally connected to said water source;
    said main boom section having a distal end;

said extension boom section having a proximate end hingedly connected to said main boom distal end and an extension boom section distal end;
said first antenna being located at said hinged connection of said boom sections; and
said second antenna being located on said extension boom section in spaced relation from said extension boom section proximate end.

5. The invention of claim 4, which includes:
said boom drives comprising drive towers attached to said main and extension boom sections;
said extension boom section drive tower being steerable; and
said processor steering said extension boom section drive tower.

6. The invention of claim 5, which includes:
said main boom section having a generally circular movement path;
said extension boom section being movable through a range of movement relative to said main boom section from a fully-retracted angle of approximately 90° with said main boom section oriented perpendicularly to the sides of a generally square field to maximum partial extension angle of slightly less than 180° with said main boom section extending towards corners of said field.

7. The invention of claim 1, which includes:
said field having corner areas beyond a circular area covered by said main boom section;
said extension boom section substantially covering said corner areas;
said extension boom section being guided through said corner areas by GNSS positioning signals received by said first and second antennas; and
said controller computing vector orientations of said extension boom section for guiding said extension boom section through said corner areas.

8. The invention of claim 1, which includes:
said field having a rectangular configuration with parallel sides having greater lengths than ends of said field and corners of said field;
said irrigation equipment having a linear travel path between and generally parallel to said field sides;
said boom assembly having a linear travel configuration with said extension boom section fully retracted; and
said boom assembly having an end configuration with said extension boom section partially retracted and covering said field corners.

9. The invention of claim 1, which includes:
said controller and said boom drives being connected by one of a group comprising a computer area network (CAN) bus, a software protocol and a wireless connection.

10. The invention of claim 1, which includes:
said boom assembly having a main section drive tower on said main boom section, a steerable extension section drive tower on said extension boom section and an intermediate drive tower located in proximity to said hinged connection of said main and extension boom sections.

11. A GNSS-based system for positioning a center-pivot irrigation boom assembly including a boom drive for rotating the boom assembly around a center-pivot water source, which system includes:
a first GNSS antenna mounted on the boom assembly;
a GNSS receiver mounted on the boom assembly and connected to the first GNSS antenna;
a second GNSS antenna mounted on the boom assembly in spaced relation outwardly from said first GNSS antenna and connected to the receiver;
said second GNSS antenna forming a baseline with said first GNSS antenna;
a controller including a processor connected to and receiving input signals from said receiver, said processor being adapted for computing position solutions for said antennas using GNSS ranging signals received by said receiver;
said processor being adapted for computing a vector projecting from said baseline using said position solutions;
said controller being adapted for controlling the boom drive using said vector and said position solutions;
said boom assembly including multiple spray nozzles;
each said spray nozzle having a variable discharge rate; and
said processor being adapted for selectively and individually controlling said spray nozzle discharge rates based on GNSS-defined positions of said antennas and vectors of said boom assembly.

12. A GNSS-based control system for a center-pivot irrigation boom assembly with a main boom section, an extension boom section hingedly connected to the main boom section and boom drives mounted on said main and extension boom sections respectively, which control system includes:
a first GNSS antenna mounted on the boom assembly;
a GNSS receiver mounted on the boom assembly and connected to the first GNSS antenna;
a second GNSS antenna mounted on the extension boom section and connected to the receiver;
a controller including a processor connected to and receiving input signals from said receiver, said processor being adapted for computing position solutions for said antennas using the GNSS ranging signals received by said receiver; and
said controller being adapted for controlling said extension boom section drives using said position solutions;
a radio frequency (RF) correction signal receiver connected to said controller;
an RTK base including a base GNSS antenna, a base RTK receiver connected to said base antenna and a base RTK transmitter connected to said base antenna;
said RTK base being located in spaced relation from irrigation equipment and transmitting RTK correction signals to said correction signal receiver;
said irrigation equipment having a center-pivot configuration with a central water source and said boom assembly main section having a proximate end pivotally connected to said water source;
said main boom section having a distal end;
said extension boom section having a proximate end hingedly connected to said main boom distal end and an extension boom section distal end;
said first antenna being located at said hinged connection of said boom sections;
said second antenna being located on said extension boom section in spaced relation from said extension boom section proximate end;
boom drives comprising drive towers attached to said main and extension boom sections;
said extension boom section drive tower being steerable;
said processor steering said extension boom section drive tower;
said boom assembly including multiple spray nozzles;
each said spray nozzle having a variable discharge rate; and said processor being adapted for selectively and individually controlling said spray nozzle discharge rates based on GNSS-defined positions of said extension boom section.

13. The invention of claim 12, which includes:
said main boom section having a generally circular movement path;
said extension boom section being movable through a range of movement relative to said main boom section from a fully-retracted angle of approximately 90° with said main boom section is adapted to be oriented perpendicularly to the sides of a generally square field to maximum partial extension angle of slightly less than 180° with said main boom section extending towards corners of said field.

14. The invention of claim 13, which includes:
said field having corner areas beyond a circular area covered by said main boom section;
said extension boom section substantially covering said corner areas;
said extension boom section being guided through said corner areas by GNSS positioning signals received by said first and second antennas; and
said controller computing vector orientations of said extension boom section for guiding said extension boom section through said corner areas.

15. The invention of claim 13, which includes:
an obstacle located in said field in the path of said boom assembly;
said controller being programmed with a GNSS-defined location of said obstacle;
said extension boom section having a stop position in proximity to said obstacle; and
said stop position being GNSS-defined.

16. The invention of claim 13, which includes:
said field having a rectangular configuration with parallel sides having greater lengths than ends of said field and corners of said field;
said irrigation equipment having a linear travel path between and generally parallel to said field sides;
said boom assembly having a linear travel configuration with said extension boom section fully retracted; and
said boom assembly having an end configuration with said extension boom section partially retracted and covering said field corners.

17. The invention of claim 12, which includes:
said controller and said boom drives being connected by one of a group comprising a computer area network (CAN) bus, a software protocol and a wireless connection.

18. The invention of claim 12, which includes:
said boom assembly having a main section drive tower on said main boom section, a steerable extension section drive tower on said extension boom section and an intermediate drive tower located in proximity to said hinged connection of said main and extension boom sections.

19. A method of guiding an articulated, center-pivot irrigation equipment boom assembly including: a main boom section with a proximate end connected to a center-pivot water source, a distal end and a main boom section drive; and an extension boom section having a proximate end hingedly connected to said main boom section distal end, a distal end and an extension boom section drive, which method includes the steps of:
mounting a first GNSS antenna on the boom assembly;
mounting a GNSS receiver on the boom assembly and connecting said receiver to said first GNSS antenna;
mounting a second GNSS antenna on the extension boom section and connecting said second GNSS antenna to said receiver;
providing a controller including a processor;
connecting said processor to said receiver and providing input signals from said receiver to said processor;
computing position solutions for said antennas with said receiver using GNSS ranging signals received by said receiver;
controlling said extension section boom drive using said position solutions;
providing said boom assembly with multiple spray nozzles;
providing each said spray nozzle with a variable discharge rate;
said processor selectively and individually controlling said spray nozzle discharge rates based on GNSS-defined positions of said extension boom section;
servicing multiple fields with an RTK base;
providing each said field with a respective GNSS-based control system controlling said irrigation equipment;
wherein each said field has a generally elongated rectangular configuration; and
said processor guiding said irrigation equipment along a linear travel path between innings of each said field wherein said extension boom section partially extends into corners of each said field.

20. The method of claim 19, which includes the additional steps of:
providing an RF correction signal receiver and connecting said correction signal receiver to said controller;
providing said RTK base including a base GNSS antenna, a base RTK receiver and a base RTK transmitter;
connecting said base RTK receiver to said base antenna;
connecting said base RTK transmitter to said base antenna;
locating said RTK base in spaced relation from said irrigation equipment; and
transmitting RTK correction signals to said correction signal receiver.

21. The method of claim 19 wherein each said field has a generally square configuration with a contained circular coverage area for said main boom section and corners located outside of said circular coverage area, which method includes the additional steps of:
locating said first antenna at the hinged connection between said main and extension boom sections;
locating said second antenna in spaced relation outwardly along said extension boom section from said first antenna;
providing said extension boom section with a steerable drive tower;
moving said main boom section through a generally circular movement path;
moving said extension boom section relative to said main boom section between a fully-retracted angle of approximately 90° with said main boom section extending towards a respective side and a maximum partial extension angle of slightly less than 180° with said main boom section oriented towards a respective corner;
said controller computing vector orientations of said extension boom section; and
said controller guiding said extension boom section through said corners using said vector orientations.

22. The method of claim 19 wherein each said field includes an obstacle, which method includes the additional steps of:

programming said processor with the location of said obstacle;

said processor guiding said extension boom section through a modified travel path avoiding said obstacle.

23. The method of claim 22, which includes the additional steps of:

said processor guiding said extension boom section between opposite stop locations located along respective opposite sides of said obstacle; and said processor guiding said extension boom section through a path covering an area with a varying radius including a minimum radius opposite sides of said obstacle and a maximum radius diametrically opposed from said obstacle.

* * * * *